United States Patent
Tiller et al.

(10) Patent No.: US 7,234,868 B2
(45) Date of Patent: Jun. 26, 2007

(54) RADIAL PUMPING OIL SEAL FOR FLUID DYNAMIC BEARING MOTOR

(75) Inventors: Michael Ray Tiller, Santa Clara, CA (US); Robert Alan Nottingham, Santa Cruz, CA (US); Jeffry Arnold Leblanc, Aptos, CA (US); Troy Michael Herndon, San Jose, CA (US); Norbert Steven Parsoneault, Scotts Valley, CA (US)

(73) Assignee: Seagate Technology LLC, Scotts Valley, CA (US)

( * ) Notice: Subject to any disclaimer, the term of this patent is extended or adjusted under 35 U.S.C. 154(b) by 31 days.

(21) Appl. No.: 10/748,784

(22) Filed: Dec. 30, 2003

(65) Prior Publication Data
US 2004/0223673 A1    Nov. 11, 2004

Related U.S. Application Data (60) Provisional application No. 60/468,803, filed on May 7, 2003.

(51) Int. Cl.
*F16C 17/10* (2006.01)
(52) U.S. Cl. ........................................... 384/107
(58) Field of Classification Search ............... 384/107, 384/112, 113, 124, 109
See application file for complete search history.

(56) References Cited

U.S. PATENT DOCUMENTS

| | | | |
|---|---|---|---|
| 5,653,540 A * | 8/1997 | Heine et al. ............... | 384/123 |
| 5,685,647 A | 11/1997 | Leuthold et al. ........... | 384/113 |
| 5,716,141 A | 2/1998 | Chen ......................... | 384/114 |
| 5,793,129 A | 8/1998 | Parsoneault et al. ....... | 310/42 |
| 5,847,479 A | 12/1998 | Wang et al. ................ | 310/90 |
| 5,908,247 A | 6/1999 | Leuthold et al. ........... | 384/114 |
| 5,925,955 A | 7/1999 | Norris ........................ | 310/90 |
| 5,940,246 A | 8/1999 | Khan et al. ................ | 360/99.08 |
| 5,956,204 A | 9/1999 | Dunfield et al. ........... | 360/98.07 |
| 5,969,903 A | 10/1999 | Parsoneault et al. ....... | 360/99.08 |
| 5,977,674 A | 11/1999 | Leuthold et al. ........... | 310/90 |

(Continued)

OTHER PUBLICATIONS

International Search Report Application No. PCT/US 02/40784 dated Sep. 18, 2003.

*Primary Examiner*—Lenard A. Footland
(74) *Attorney, Agent, or Firm*—Stephen C. Durant; Novak Druce & Quigg LLP (57) ABSTRACT

An improved rotational motor, such as a spindle motor for a disc drive, is provided. The motor first comprises a hub having a shaft portion and a horizontal body portion. The motor also comprises a sleeve surrounding the shaft portion of the hub. A fine first vertical gap is retained between the shaft and the inner diameter of the surrounding sleeve. In addition, a fine horizontal gap is provided between the upper hub portion and the top of the sleeve. A third gap is preferably provided between the hub and an outer diameter of the sleeve. The first vertical gap is filled with a lubricating liquid, such as a clean oil. A capillary seal is provided in the third gap. In one embodiment, the lubricating liquid extends into the horizontal gap. Oil pumping grooves are machined along the horizontal fluid gap. When the hub is rotated, the oil pumping grooves impel oil towards the shaft. This prevents any portion of the first vertical gap from becoming un-lubricated during rotation of the shaft.

13 Claims, 9 Drawing Sheets

U.S. PATENT DOCUMENTS

| | | | |
|---|---|---|---|
| 5,980,113 A | 11/1999 | Grantz | 384/108 |
| 6,019,516 A | 2/2000 | Leuthold et al. | 384/110 |
| 6,055,126 A | 4/2000 | Kennedy et al. | 360/99.08 |
| 6,065,877 A | 5/2000 | Leuthold et al. | 384/278 |
| 6,118,620 A | 9/2000 | Grantz et al. | 360/99.08 |
| 6,137,650 A | 10/2000 | Heine et al. | 360/98.07 |
| 6,144,523 A | 11/2000 | Murthy et al. | 360/99.08 |
| 6,148,501 A | 11/2000 | Grantz et al. | 29/603.03 |
| 6,149,159 A | 11/2000 | Kloeppel et al. | 277/399 |
| 6,149,161 A | 11/2000 | Grantz et al. | 277/427 |
| 6,183,135 B1 | 2/2001 | Kloeppel et al. | 384/112 |
| 6,280,088 B1 | 8/2001 | Leuthold et al. | 384/110 |
| 6,285,527 B1 | 9/2001 | Kennedy et al. | 360/99.08 |
| 6,296,390 B1 | 10/2001 | Wolff et al. | 384/112 |
| 6,296,391 B1 | 10/2001 | Hayakawa et al. | 384/119 |
| 6,402,383 B1 | 6/2002 | Parsoneault et al. | 384/100 |
| 6,575,634 B2 | 6/2003 | Nottingham | 384/110 |
| 6,583,952 B1 | 6/2003 | Grantz et al. | 360/99.08 |
| 6,594,883 B2 | 7/2003 | Kloeppel et al. | 29/596 |
| 2004/0208404 A1* | 10/2004 | Dittmer et al. | 384/107 |

* cited by examiner

FIG. 1
(KNOWN)

RADIAL PUMPING OIL SEAL FOR FLUID DYNAMIC BEARING MOTOR

CROSS-REFERENCE TO RELATED APPLICATIONS

This new application for letters patent claims priority from an earlier filed provisional patent application entitled "Radial Pumping Oil Seal For Fluid Dynamic Bearing Motor." That application was filed on May 7, 2003 and was assigned Application No. 60/468,803.

BACKGROUND OF THE INVENTION

1. Field of the Invention

The present invention relates to fluid dynamic bearing motors. More specifically, the present invention pertains to fluid dynamic bearing motors such as are used to support and rotationally drive one or more memory discs.

2. Description of the Related Art

The computer industry employs magnetic discs for the purpose of storing information. This information may be stored and later retrieved using a disc drive system. Computer systems employ disc drive systems for transferring and storing large amounts of data between magnetic discs and the host computer. The magnetic discs are typically circular in shape (though other shapes are known), and are comprised of concentric, or sometimes spiraled, memory tracks. Each track contains magnetic data. Transitions in the magnetic data are sensed by a magnetic transducer known as a read/write head. The transducer is part of the disc drive system, and moves radially over the surface of the disc to read and/or write magnetic data.

Figure 1:
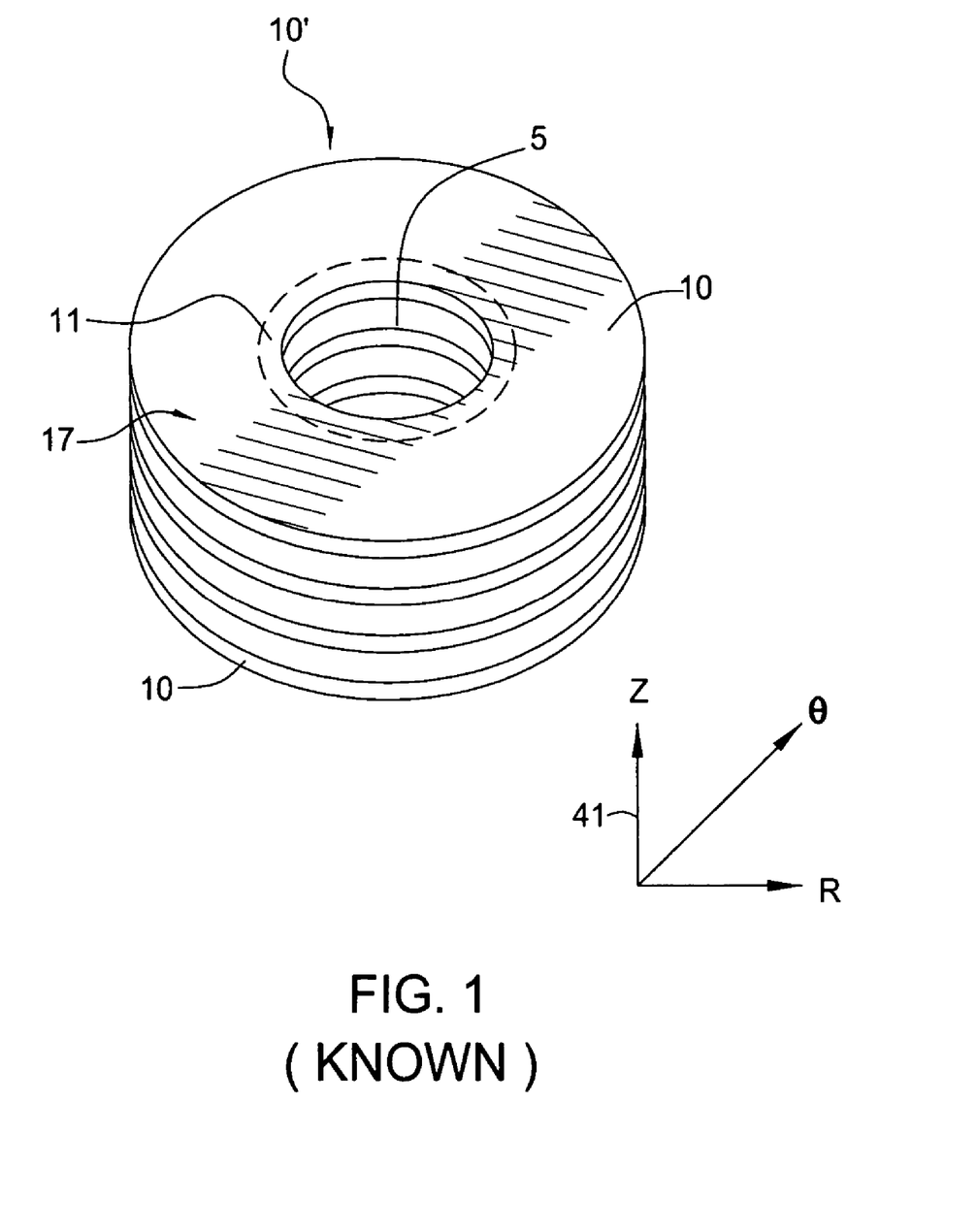
FIG. 1 demonstrates a perspective view of magnetic media, i.e., thin film magnetic discs, as are commonly employed for information storage. In this view, a plurality of stacked discs is shown.

FIG. 1 presents a perspective view of magnetic media 10 as are commonly employed for information storage. In this view, a plurality of stacked magnetic discs 10' is shown. The discs 10' in FIG. 1 are shown in vertical alignment as is common within a disc drive system. Each disc 10 has a central concentric opening 5 for receiving a spindle (shown at 51 in FIG. 2). A rotary motor drives the spindle 51, causing the discs 10 of the disc pack 10' to rotate in unison.

Figure 2:
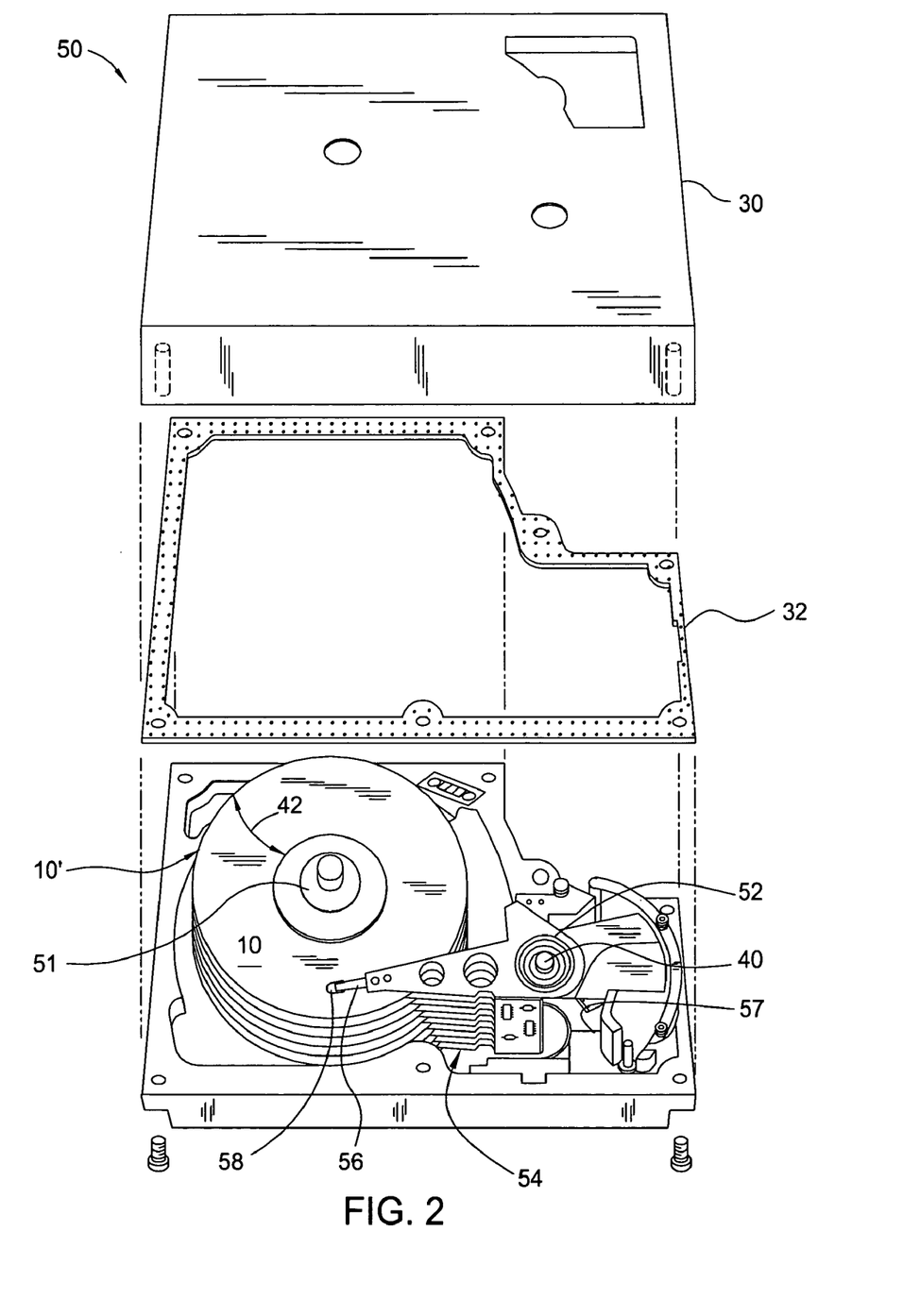
FIG. 2 illustrates a perspective view of an exemplary disc drive assembly as might employ the improved spindle motor arrangement of the present invention.

As noted, the disc 10 itself is supported on a drive spindle 51. The drive spindle 51 rotates the disc 10 relative to the magnetic head assembly 58. FIG. 2 provides a perspective view of a disc drive assembly 50. In this arrangement, a plurality of discs 10' are stacked vertically within the assembly 50, permitting additional data to be stored, read and written. The drive spindle 51 receives the central openings 5 of the respective discs 10. Separate suspension arms 56 and corresponding magnetic head assemblies 58 reside above each of the discs 10. The assembly 50 includes a cover 30 and an intermediate seal 32 for providing an air-tight system. The seal 32 and cover 30 are shown exploded away from the disc stack 10' for clarity.

In operation, the discs 10 are rotated at high speeds about an axis (not shown). As the discs 10 rotate, the air bearing slider on the head 58 causes the magnetic head 58 to be suspended relative to the rotating disc 10. The flying height of the magnetic head assembly 58 above the disc 10 is a function of the speed of rotation of the disc 10, the aerodynamic lift properties of the slider along the magnetic head assembly 58 and, in some arrangements, a biasing spring tension in the suspension arm 56.

The servo spindle 52 pivots about pivot axis 40. As the servo spindle 52 pivots, the magnetic head assembly 58 mounted at the tip of its suspension arm 56 swings through arc 42. This pivoting motion allows the magnetic head 58 to change track positions on the disc 10. The ability of the magnetic head 58 to move along the surface of the disc 10 allows it to read data residing in tracks along the magnetic layer of the disc. Each read/write head 58 generates or senses electromagnetic fields or magnetic encodings in the tracks of the magnetic disc as areas of magnetic flux. The presence or absence of flux reversals in the electromagnetic fields represents the data stored on the disc.

Figure 3:
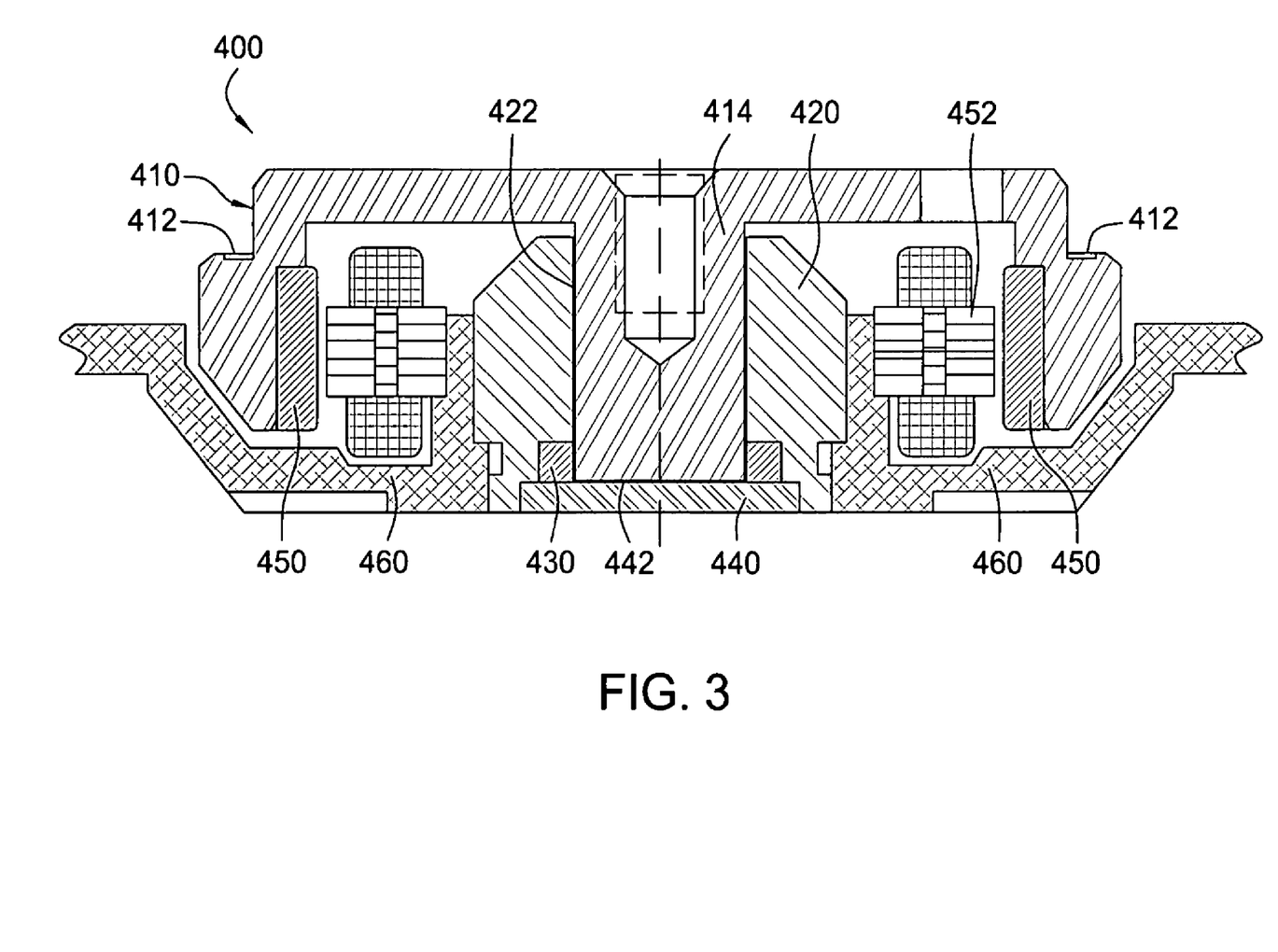
FIG. 3 provides a cross-sectional view of a known spindle motor arrangement.

In order to accomplish the needed rotation of discs, an electric motor is provided. The electric motor is commonly referred to as a "spindle motor" by virtue of the drive spindle 51, or "hub," that closely receives the central opening 5 of a disc 10. FIG. 3 illustrates the basic elements of a known spindle motor design, in cross-section. The motor 400 first comprises a hub 410. The hub 410 includes an outer radial shoulder 412 for receiving a disc (not shown in FIG. 3). The hub 410 also includes an inner shaft 414. In this arrangement, the shaft 414 resides and rotates on a stable counterplate 440. A sleeve 420 is provided along the outer diameter of the shaft 414 to provide lateral support to the shaft 414 while it is rotated.

It can be seen that a bearing surface 422, or "journal surface," is formed between the shaft 410 and the surrounding sleeve 420. In early arrangements, one or more ball bearing systems (not shown) was incorporated into the hub 410 to aid in rotation. Typically, one of the bearings would be located near the top of the shaft, and the other near the bottom. A raceway would be formed in either the shaft or the sleeve for holding the plurality of ball bearings. The bearings, in turn, would be lubricated by grease or oil. However, various shortcomings were realized from the mechanical bearing system, particularly as the dimensions of the spindle motor and the disc tracks became smaller. In this respect, mechanical bearings are not always scaleable to smaller dimensions. More significantly, in some conditions ball bearings generate unwanted vibrations in the motor assembly, causing the read/write head to become misaligned over the tracks. Still further, there is potential for leakage of grease or oil into the atmosphere of the disc drive, or outgassing of the components into this atmosphere.

In response to these problems, hydrodynamic bearing spindle systems have been developed. In these types of systems, lubricating fluid is placed along bearing surfaces defined around the rotating spindle/hub. The fluid may be in the form of gas, such as air. Air is popular because it avoids the potential for outgassing of contaminants into the sealed area of the head disc housing. However, air cannot provide the lubricating qualities of oil or the load capacity. Further, its low viscosity requires smaller bearing gaps and, therefore, higher tolerance standards to achieve similar dynamic performance. As an alternative, fluid in liquid form has been used. Examples include oil and ferro-magnetic fluids. A drawback to the use of liquid is that the liquid lubricant should be sealed within the bearing to avoid leakage. Any loss in fluid volume results in a reduced bearing load capacity and life for the motor. In this respect, the physical surfaces of the spindle and of the housing would come into contact with one another, leading to accelerated wear and eventual failure of the bearing system.

Returning back to FIG. 3, the motor 400 of FIG. 3 represents a hydrodynamic bearing system. A thrust plate 430 is disposed between the shaft 414 and the surrounding sleeve 420. Fluid is injected in gaps maintained between the shaft 414 and surrounding parts, e.g., the counterplate 440, the sleeve 420, and the thrust plate 430. The fluid defines a thin fluid film that cushions relative movement of hub parts.

The motor 400 is actuated by energizing coils in a stator in cooperation with one or more magnets. In the view of FIG. 3, magnets 450 are seen disposed within the hub 410, while stator coils 452 are provided on a base 460. The magnets 450 and stator coils 452 interact to provide rotational movement of the hub 410.

A means for retaining fluid within a hydrodynamically operated bearing surface for a spindle motor is to provide oil pumping grooves in the vertical journal bearing surface between the shaft and the sleeve or in the thrust bearing gap between the shaft and the counterplate. However, in the case of a straight-shaft journal bearing, axial space that could be used for journal bearing surface is rendered ineffective due to its being devoid of oil from the asymmetric pumping action of the seal. Also, since the voided area is not lubricated, bearing damage could result from contact in the non-lubricated area above the grooves during rotational excitement of the spindle. Thus, a need exists for an improved fluid dynamic bearing system for a spindle motor that retains liquid within and along the bearing surfaces. Further, there is a need for such a motor that reduces or eliminates dry contact in the vertical journal bearing surface during rotation of the motor. Still further, there is a need for a hydrodynamic bearing arrangement that reduces the required length of the vertical journal bearing, as would be beneficial in the design of a hard drive for a lap-top computer, where such space is at a premium.

SUMMARY OF THE INVENTION

The present invention provides an improved motor arrangement. The arrangement is useful in connection with rotary electrical motors, such as spindle motors in disc drive systems. More specifically, the invention is most applicable to motors that employ fluid dynamic bearing surfaces between relatively rotating parts.

In an exemplary arrangement, the improved spindle motor first comprises a hub having a shaft portion and an upper horizontal body portion. The motor also comprises a sleeve surrounding the shaft portion of the hub. A first fine vertical gap is retained between the shaft and the inner diameter of the surrounding sleeve. In addition, a fine horizontal gap is provided between the upper hub portion and the top of the sleeve. Optionally, a third fine gap is provided between an outer hub portion and the outer diameter of the sleeve. The first vertical gap is filled with a lubricating liquid, such as a clean oil. In one arrangement, the lubricating liquid extends into the horizontal gap and the third outer gap.

Preferably, a capillary seal is provided in the third fluid gap at one end. The capillary seal is disposed at an upper end of the third gap proximal to the second horizontal gap. In addition, oil pumping grooves are machined along the horizontal fluid gap. The oil pumping grooves may be machined into the top of the sleeve, though preferably they are machined into the bottom of the upper hub portion. The oil pumping grooves are used to impel oil towards the shaft of the hub. In this respect, the location of the oil pumping grooves prevents un-lubricated contact between the shaft and the sleeve and also requires a shorter sleeve and shaft than in conventional designs.

In an alternative embodiment, the improved spindle motor first comprises a hub fitted with a vertical sleeve portion inside of the hub. The motor also comprises a fixed shaft disposed within the sleeve. Fitted outside of the shaft over the sleeve is a shield. A first fine vertical gap is retained between the shaft and the inner diameter of the surrounding sleeve. In addition, a fine horizontal gap is provided between the bottom of the shield and the top of the sleeve. Optionally, a third fine gap is provided between the shield and the outer diameter of the sleeve. The first vertical gap is filled with a lubricating liquid, such as a clean oil. In one arrangement, the lubricating liquid extends into the horizontal gap and the third outer gap.

Preferably, a capillary seal is provided in the third fluid gap at one end. The capillary seal is disposed at an upper end of the third gap proximal to the second horizontal gap. In addition, oil pumping grooves are machined along the horizontal fluid gap. The oil pumping grooves may be machined into the top of the sleeve, though preferably they are machined into the bottom of the shield. The oil pumping grooves are used to impel oil towards the shaft of the hub. In this respect, the location of the oil pumping grooves prevents un-lubricated contact between the shaft and the sleeve and also requires a shorter sleeve and shaft than in conventional designs.

BRIEF DESCRIPTION OF THE DRAWINGS

So that the manner in which the above recited features of the present invention can be understood in detail, a more particular description of the invention, briefly summarized above, may be had by reference to the appended drawings. It is to be noted, however, that the appended drawings (FIGS. 5–8) illustrate only typical embodiments of this invention and are therefore not to be considered limiting of its scope.

DETAILED DESCRIPTION OF THE PREFERRED EMBODIMENT

The present invention provides an improved spindle motor arrangement 500, 600. The improved motor 500, 600 employs a novel radial pumping oil seal as a means of protecting the hub and sleeve from damage due to un-lubricated contact between relatively moving components and a means to reduce the length of the shaft and sleeve.

Figure 4:
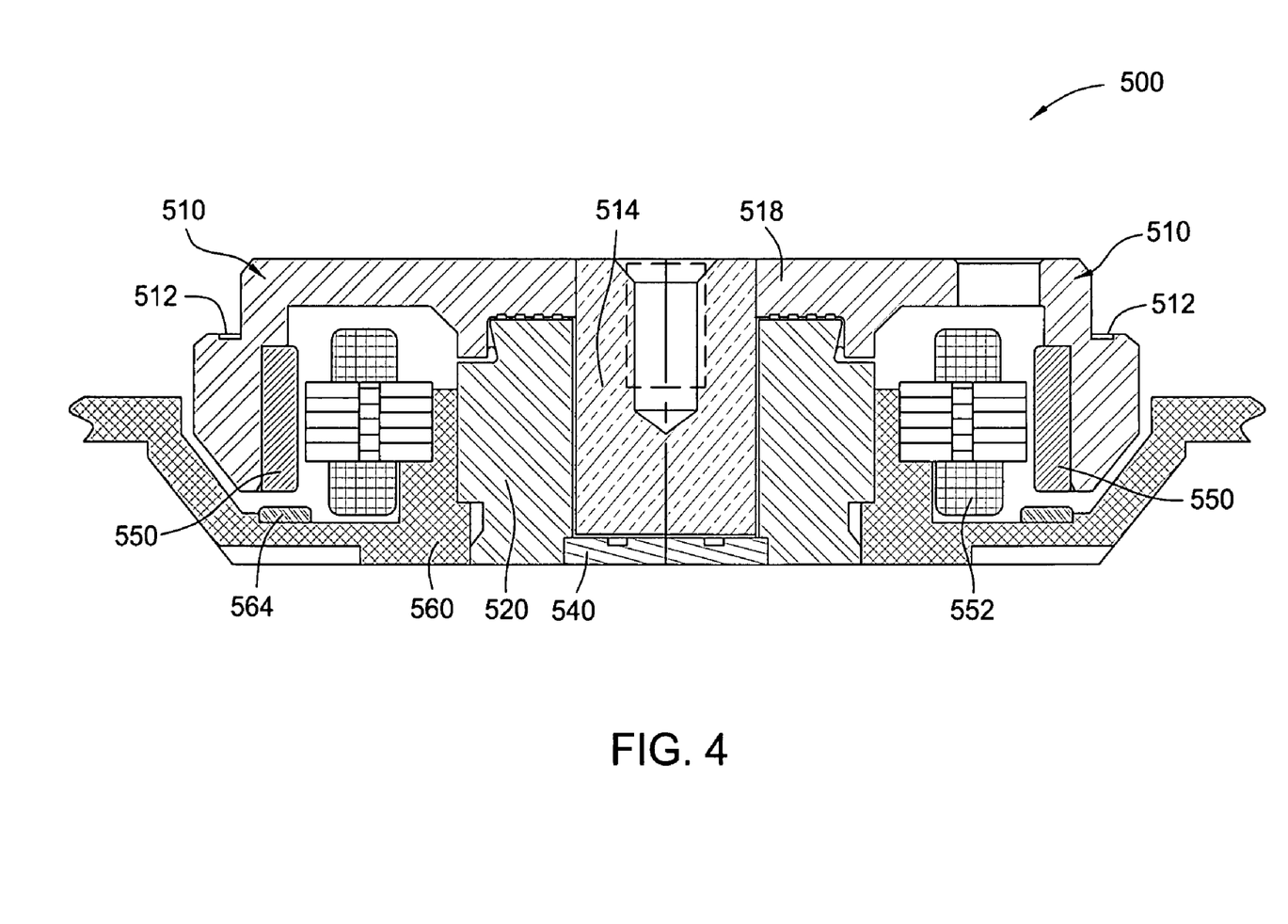
FIG. 4 presents a cross-sectional view of an improved spindle motor arrangement in which oil pumping grooves are machined.

FIG. 4 presents a cross-sectional view of an improved spindle motor arrangement 500 in one embodiment, in which oil pumping grooves 527 (see FIG. 6) are machined. The motor 500 first comprises a hub 510. The hub 510 includes a radial shoulder 512 for receiving and supporting a body to be rotated, such as a magnetic disc (not shown). The hub 510 includes a central shaft 514 and a horizontal body portion 518. The shaft 514 is configured for constant high speed rotation. This rotation is established by a stator 552 which is mounted from a base 560. The stator 552 typically defines an electric coil that, when energized, creates a magnetic field. The energized coil cooperates with magnets 550 which are mounted from an inner surface of the hub 510.

Figure 5:
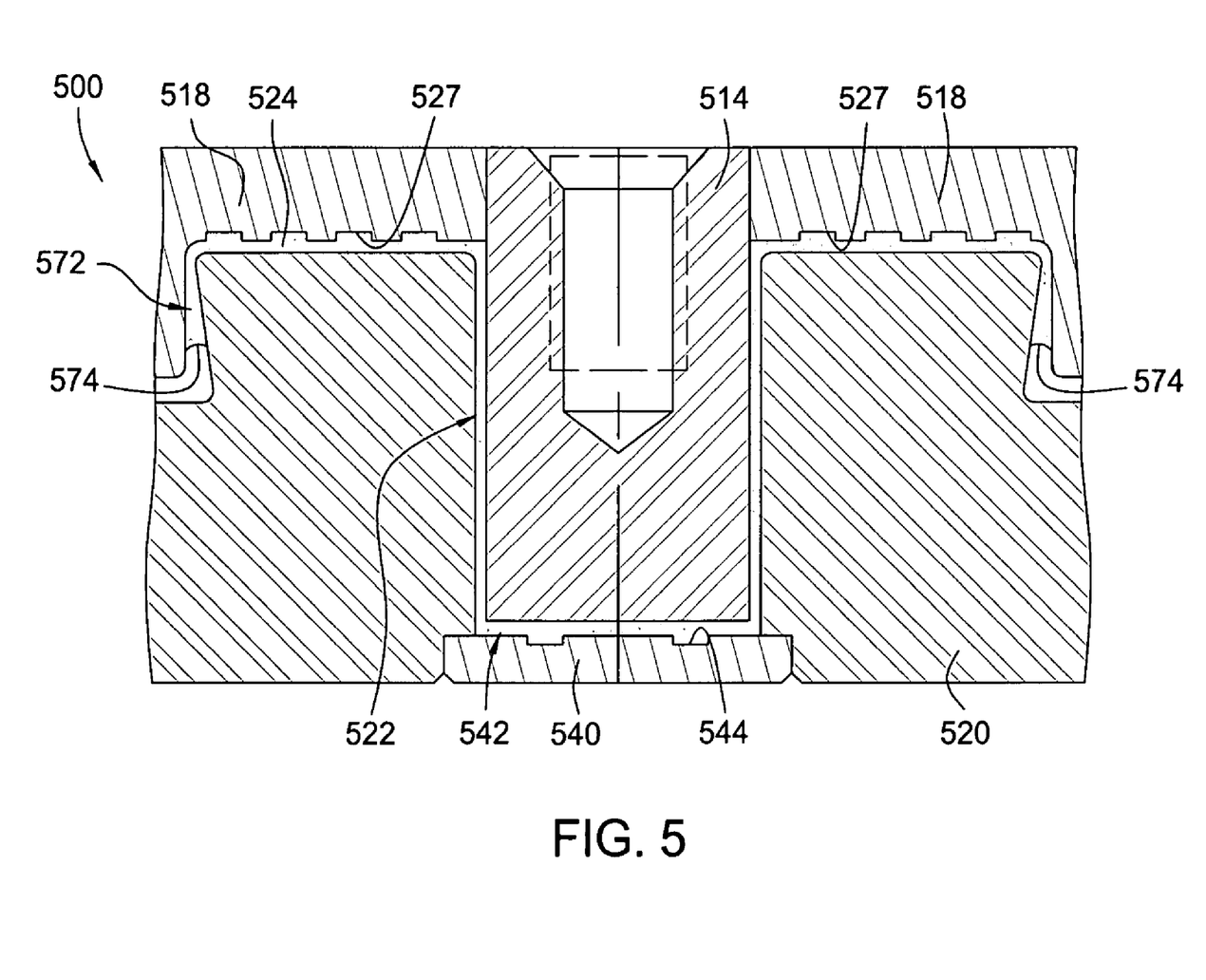
FIG. 5 illustrates an enlarged view of the gaps formed between the shaft of the spindle motor of FIG. 5, and the surrounding sleeve.

As noted, the shaft 514 is configured for high speed rotation. In this respect, the shaft 514 rotates on a stationary counterplate 540. FIG. 5 illustrates an enlarged view of the interfaces among the shaft 514, counterplate 540, sleeve 520, and horizontal body portion 518 of the hub 510. The interface between the bottom of the shaft 514 and the top of the counterplate 540 thus defines a thrust bearing 542. Liquid lubricant is provided along the thrust bearing gap 542 to provide a fluid bearing surface. The top face of the counterplate 540 may optionally include a grooved pattern 544 for receiving and holding liquid lubricant when the motor 500 is at rest. When the motor 500 is at rest, the shaft 514 presses directly on the counterplate 540. Fluid is then extruded around the outer diameter of the shaft 514.

The motor 500 of FIG. 4 next comprises a sleeve 520. In the arrangement of FIG. 5, the sleeve 520 is stationary, and is supported on the counterplate 540. The sleeve 520 is disposed between the rotating shaft 514 and the surrounding base 560. Referring to FIG. 5, it can be seen that the interface between the rotating shaft 514 and the surrounding sleeve 520 defines a second bearing surface 522. The second bearing surface 522 is substantially vertical, and also receives liquid lubricant. This vertical bearing surface 522 can also be configured with pumping grooves (not shown). Also notable is a third fluid-holding gap 572 located between the hub 510 and the outer diameter of the sleeve 520. The third gap 572 may also receive fluid.

To prevent the shaft 514 and connected hub 510 from being displaced axially too far above the counterplate 540, since this is an axially upward thrust bearing 542 between the shaft end and the counterplate 540, an opposing bias is typically introduced. This bias is utilized to prevent the thrust bearing gap 542 from becoming too large, which would reduce the effectiveness of the motor 500. Approaches to this can be seen in the provision of a bias magnet 564 facing the motor magnet 550 and axially spaced therefrom. By selecting a suitable size and location for this bias magnet 564, an appropriate bias against the shaft 514 being axially displaced too far from the counterplate 540 or the base 560 can be optionally introduced.

To ensure proper lubrication of the thrust bearing surface 542, oil pumping grooves 527 are provided. The oil pumping grooves 527 are positioned along a gap 524 between the horizontal body portion 518 of the hub 510 and the sleeve 520. The oil pumping grooves 527 may be disposed along the surface of either the horizontal body portion 518 of the hub 510, or the sleeve 520. Preferably, the grooves 527 are placed along the hub 510, as shown in FIGS. 4 and 5.

To inhibit the loss of liquid lubricant from the gaps 522, 524, 542, and 572 during operation, a capillary seal 574 is optionally provided. In conventional arrangements, the capillary seal 574 is located at the end of the sleeve bearing gap 522 distal from the thrust bearing gap 542. Further information concerning operation of a capillary seal within a bearing gap is disclosed in U.S. Pat. No. 5,524,986 entitled "Fluid Retention Principles for Hydrodynamic Bearings." That patent issued to Seagate Technologies, Inc. in 1996, and is incorporated herein in its entirety by reference. According to the preferred embodiment shown, the capillary seal 574 is located in a third hub-sleeve gap 572 proximate to the horizontal (second) hub-sleeve gap 524. The cap seal 574 may also be placed in the gap 524 behind the oil pumping grooves 527, or not be provided at all.

Operation of this impeller phenomenon is as follows. When the motor 500 is energized and the shaft 514 and connected hub 510 are rotated, a high pressure region is created in horizontal gap 524 by the oil pumping grooves 527. This high pressure region impels oil from the gaps 572 and 524 into the sleeve bearing surface 522 and the thrust bearing surface 542. The lubricating fluid is then impelled into the thrust bearing region 542 to support relative rotation between the bottom end of the shaft 514 and the facing surface of the counterplate 540. During rotation, the fluid is maintained in the gap 542 by the grooved pattern during rotation. Obviously, when the shaft comes to rest, the shaft end will rest on the plate 540 and, although the volume of fluid is very small, it will tend to be forced back out into the gaps 524 and 572. Therefore, space must be allowed in these gaps 524 and 572 for this fluid. When the motor 500 is idle, the capillary seal 574 aids in maintaining fluid within the bearing system. Preferably, the gaps 572 and 524 and the volume of lubricating fluid are configured so that the gaps 572 and 524 are dry during rotation of the shaft to prevent any power loss or bearing effect. Preferably, the gaps 522, 524 and 572 are relatively sized so that if the shaft 514 tilts during rotation, the hub 510 does not contact the sleeve 520 in the gaps 572 and 524. As noted earlier, in previous designs the capillary seal was located in the bearing gap 522, proximate to the second gap 524. The impeller means was located either (or both) in the thrust bearing gap 542, or in the first journal bearing gap 522. When the impeller means pushed or pulled oil into the thrust bearing gap 542, an un-lubricated area would result in the upper portion of the journal bearing 522. This could lead to damage of the shaft 514 and sleeve 520 resulting from frictional contact in the un-lubricated area, particularly if the shaft 514 were to tilt from vibration. In the present invention, excess oil is now able to be stored in gaps 524 and 572, with no resulting un-lubricated area in the journal bearing gap 522. Further, the shaft 514 and sleeve 520 may be shortened as capillary seal is no longer needed along the shaft 514.

Figure 6:
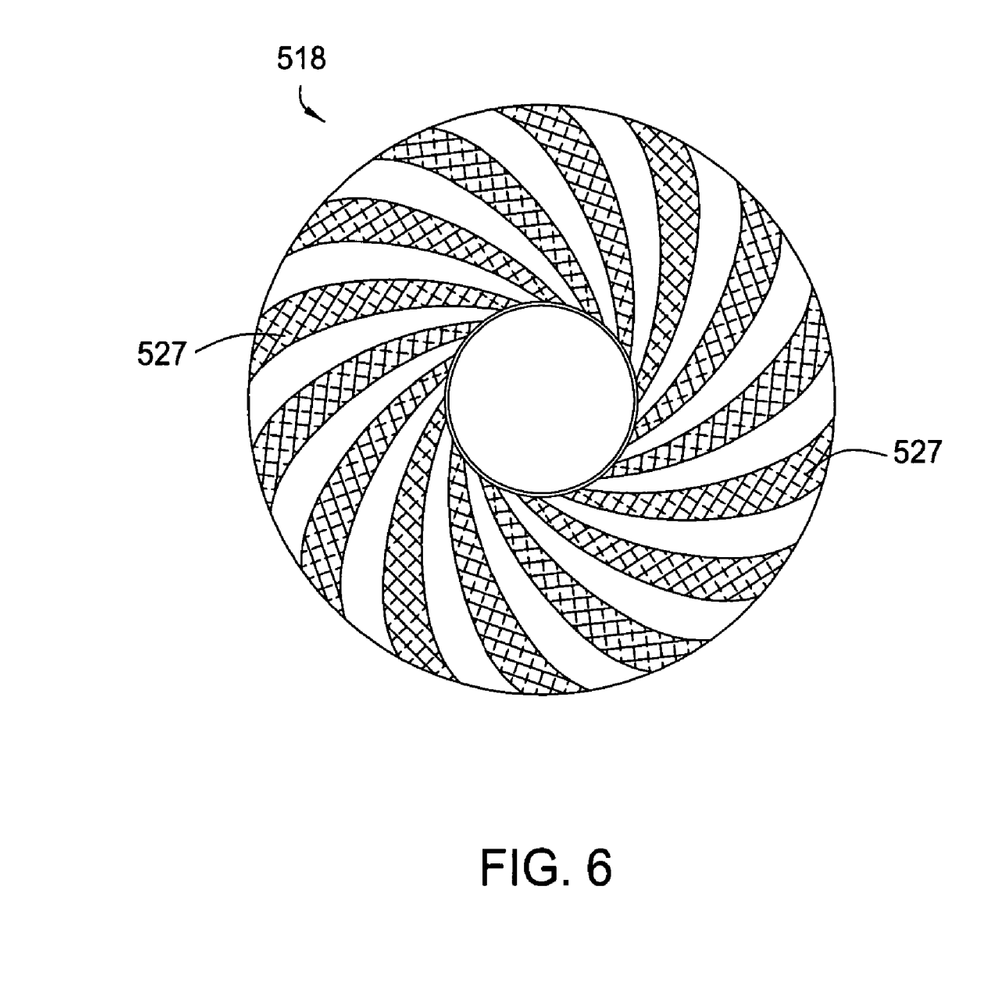
FIG. 6 depicts a bottom perspective view of the grooved portion of an exemplary hub in one embodiment.

FIG. 6 depicts a perspective view of the grooved portion of an exemplary hub 510, illustrating a preferred configuration of the oil pumping grooves 527. A bottom view is provided for the hub 510. Any type of pattern as is used to draw oil in a fluid dynamic bearing is suitable to serve as the oil pumping groove.

Figure 7:
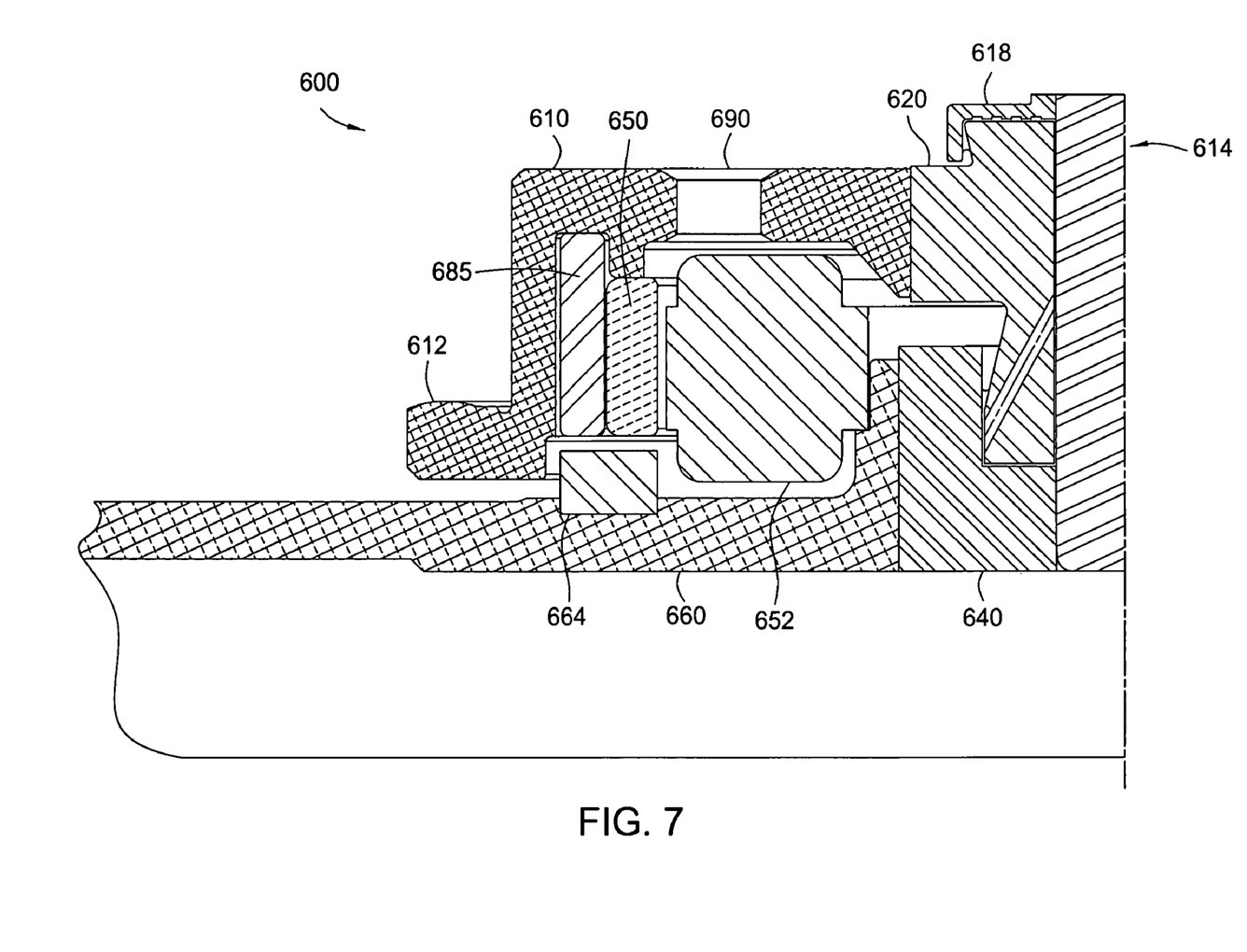
FIG. 7 presents a partial cross-sectional view of an alternate embodiment of an improved spindle motor arrangement in which oil pumping grooves are machined.

FIG. 7 presents a partial cross-sectional view of an improved spindle motor arrangement 600 in an alternative embodiment, in which oil pumping grooves 627 are machined. The motor 600 first comprises a hub 610. Fitted inside the hub 610 is a sleeve 620. The sleeve 620 is fit by known means, such as a shrink fit. The hub 610 includes a radial shoulder 612 for receiving and supporting a body to be rotated, such as a magnetic disc (not shown). The hub 610 and sleeve 620 are configured for constant high speed rotation. This rotation is established by a stator 652 which is mounted from a base 660. The stator defines an electric coil that, when energized, creates a magnetic field. The energized coil cooperates with magnets 650 which are mounted from the inner surface of the hub 610.

Figure 8:
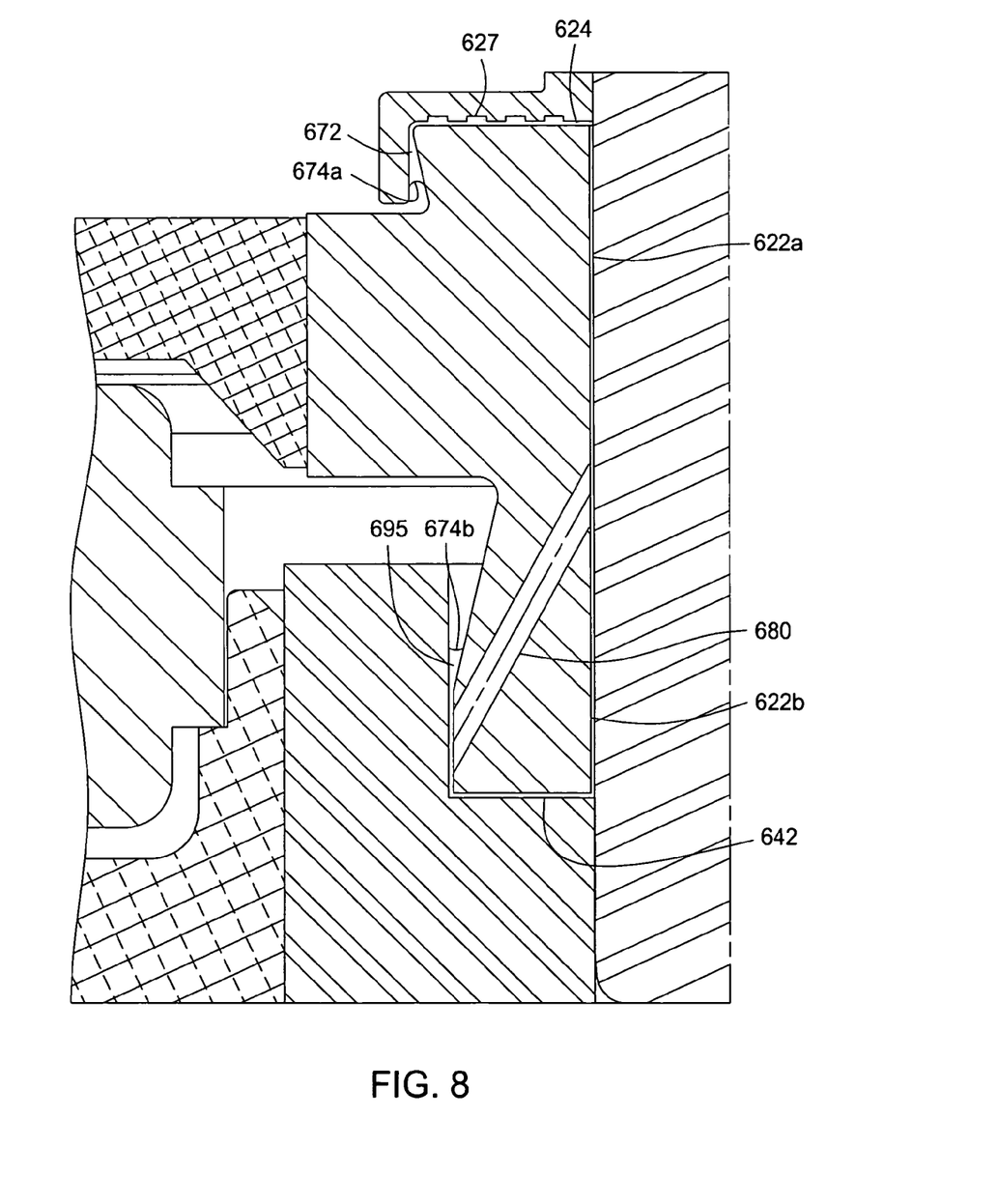
FIG. 8 illustrates an enlarged view of the gaps formed between the shaft of the spindle motor of FIG. 8, and the surrounding sleeve.

As noted, the hub 610 and sleeve 620 are configured for high speed rotation. In this respect, the sleeve 620 rotates on a stationary base adapter 640. FIG. 8 illustrates an enlarged view of the interfaces among the shaft 614, base adapter 640, sleeve 620, and the shield 618. The interface between the bottom of the sleeve 620 and the top of the base adapter 640 thus defines a thrust bearing 642. Liquid lubricant is provided along the thrust bearing gap 642 to provide a fluid bearing surface. The top face of the base adapter 640 may optionally include a grooved pattern (not shown) for receiving and holding liquid lubricant when the motor 600 is at rest. When the motor 600 is at rest, the sleeve 620 presses directly on the base adapter 640. Fluid is then extruded around the inner diameter of the sleeve 620.

The motor 600 of FIG. 7 next comprises a shaft 614. In the arrangement of FIG. 7, the shaft 614 is stationary. The sleeve 620 is disposed between the stationary shaft 614 and the surrounding base adapter 640 on a lower side and the stationary shaft 614 and the hub 610 on an upper side. Referring to FIG. 8, it can be seen that the interface between the stationary shaft 614 and the surrounding sleeve defines an upper second bearing surface 622a and a lower second bearing surface 622b. The two second bearing surfaces 622a,b are separated by a re-circulating hole 680 disposed in the sleeve 620. The re-circulating hole 680 prevents any pressure difference between the upper 622a and lower 622b journal bearings and also allows any air trapped in the lubricating fluid to escape. The second bearing surfaces 622a,b are substantially vertical, and also receive liquid lubricant. These vertical bearing surfaces 622A,B can also be configured with grooves. Also notable is a third fluid-holding gap 672 located between a shield 618, fitted onto the shaft 614, and the outer diameter of the sleeve 620. The third gap 672 may also receive fluid.

To prevent the sleeve 620 and adjoining hub 610 from being displaced axially too far above the base adapter 640, since this is also an axially upward thrust bearing 642 between the sleeve end and the base adapter 640, an opposing bias is typically introduced. This bias is utilized to prevent the thrust bearing gap 642 from becoming too large, which would reduce the effectiveness of the motor 600. Approaches to this can be seen in the provision of a steel bias ring 664 facing the motor magnet 650 and axially spaced therefrom. By selecting a suitable size and location for this bias ring 664, an appropriate bias against the sleeve 620 being axially displaced too far from the base adapter 640 or the base 660 can be optionally introduced.

To ensure proper lubrication of the thrust bearing surface 642, novel oil pumping grooves 627 are provided. The oil pumping grooves 627 are positioned along a horizontal gap 624 between the shield 618 and the sleeve 620. The oil pumping grooves 627 may be disposed along the surface of either the shield 618 or the sleeve 620. Preferably, the grooves 627 are placed along the shield 618, as shown in FIGS. 7 and 8. Alternatively, the large horizontal gap (not numbered) between the base adapter 640 and the sleeve 620, above the re-circulating hole 680, may be reduced so that a second set of oil pumping grooves may be disposed along either the sleeve or the base adapter in the gap. Of course, then the second capillary seal 674b would be disposed behind the grooves.

To inhibit the loss of liquid lubricant from the gaps 622a,b, 624, 642, 672, and 695 during operation, capillary seals 674a,b are optionally provided. In conventional arrangements, the capillary seal 674a is located at the end of the sleeve bearing gap 622a distal from the thrust bearing gap 642. According to the preferred embodiment shown, the capillary seal 674a is located in a third hub-sleeve gap 672 proximate to the horizontal (second) hub-sleeve gap 624. A second capillary seal 674b is located in a sleeve-base adapter gap 695. The capillary seal 674a may also be placed in the gap 624 behind the oil pumping grooves 627, or not be provided at all. Further, the second capillary 674b seal may not be necessary.

The groove pattern 627 is configured so that oil flow is impelled towards the thrust bearing surface 642 when the hub 610 and sleeve 620 are rotated. An example of such a pattern is a spiral pattern machined into the bottom of the shield 618. Any type of pattern as is used to draw oil in a fluid dynamic bearing is suitable to serve as the oil pumping groove.

Operation of this impeller phenomenon is as follows. When the motor 600 is energized and the sleeve 620 and adjoining hub 610 are rotated, a high pressure region is created in second gap 624 by the oil pumping grooves 627 impelling oil from the gaps 672 and 624 into the sleeve bearing surface 622 and the thrust bearing surface 642. The lubricating fluid is then impelled into the thrust bearing region 642 to support relative rotation between the bottom end of the sleeve 620 and the facing surface of the base adapter 640, the fluid being maintained in the gap 642 by the grooved pattern during rotation. Obviously, when the sleeve comes to rest, the sleeve end will rest on the base adapter 640 and, although the volume of fluid is very small, it will tend to be forced back out into the gaps 624 and 672. Therefore, space must be allowed in these gaps 624 and 672 for this fluid. When the motor 600 is idle, the capillary seals 674a,b aid in maintaining fluid within the bearing system. Preferably, the gaps 672 and 624 and the volume of lubricating fluid are configured so that the gaps 672 and 624 are dry during rotation of the shaft to prevent any power loss or bearing effect. Preferably, the gaps 622, 624, 672, and 695 are relatively sized so that if the sleeve tilts during rotation, the sleeve 620 does not contact either the base adapter 640 or the shield 620. As noted earlier, in previous designs the capillary seal was located in the bearing gap 622A, distal from the gap 642. The impeller means was located either (or both) in the thrust bearing gap 642, or in the first journal bearing gap 622. When the impeller means pushed or pulled oil into the thrust bearing gap 642, an un-lubricated area would result in the upper portion of the journal bearing 622A. This could lead to damage of the shaft and sleeve resulting from frictional contact in the un-lubricated area, if the shaft were to tilt from vibration. In the present invention, excess oil is now able to be stored in gaps 672 and 624, and there is no resulting un-lubricated area in the journal bearing gap 622a. Further, the shaft 614 and sleeve 620 may be shortened as no capillary seal is needed therein.

Figure 9:
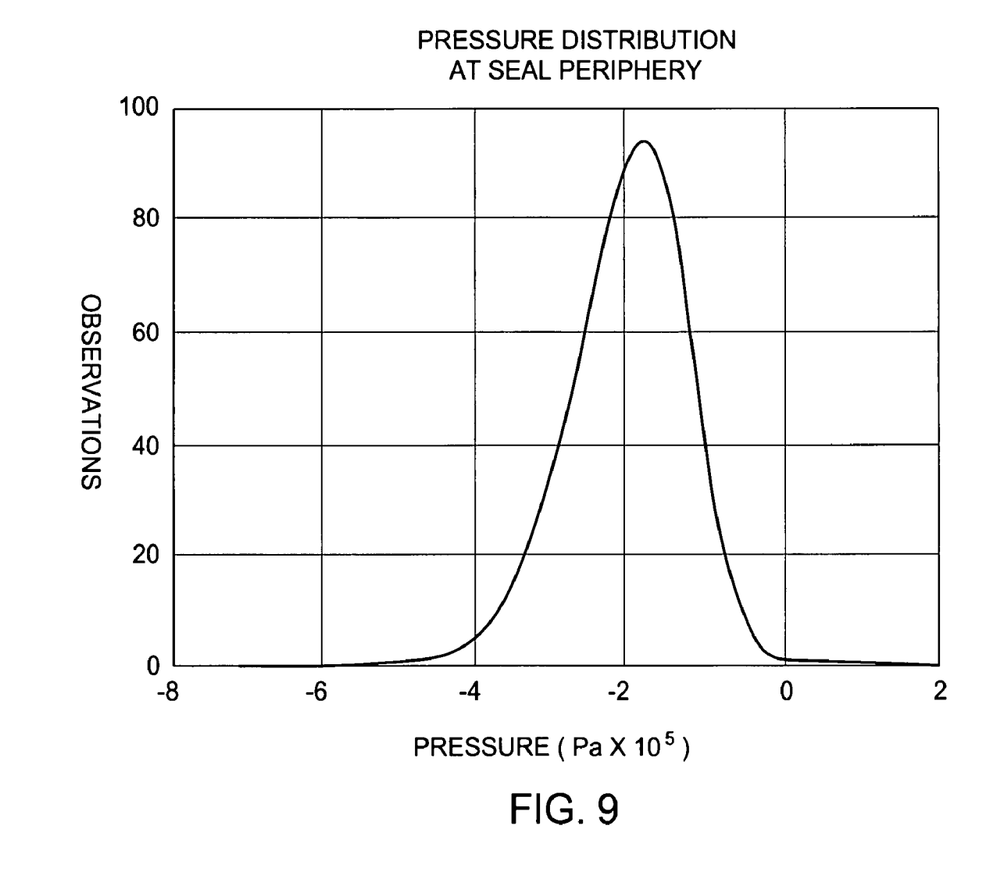
FIG. 9 illustrates the results of a simulation exhibiting the pressure effect created by the oil pumping grooves during rotation of the shaft.

FIG. 9 displays the results of a simulation conducted throughout typical taper tolerances in the oil pumping grooves 627 and gaps 624 and 672, with a zero flow boundary condition imposed at the capillary seal end 674. The pressure was measured at the capillary seal end 674a. The results show that the oil pumping grooves 627, during shaft rotation impel oil towards the thrust bearing surface 642, resulting in a vacuum effect at the capillary seal end 674a.

While the foregoing is directed to embodiments of the present invention, other and further embodiments of the invention may be devised without departing from the basic scope thereof, and the scope thereof is determined by the claims that follow.

The invention claimed is:

1. A fluid dynamic bearing defined by the interface of a hub and a sleeve, the hub having a vertical shaft portion configured to rotate within the sleeve, and a horizontal body portion configured to rotate above the sleeve, the bearing comprising:
    a first gap region between the shaft portion of the hub and the sleeve;
    a second gap region between the horizontal body portion of the hub and the sleeve, the second gap region having a first end in fluidic communication with the first gap egion and a second end exposed to an ambient environment;
    a volume of lubricating fluid within the first gap and at least proximal the first end of the second gap region; and
    an oil pumping groove pattern disposed at least partially along the second gap, the oil pumping groove pattern pumping the lubricating liquid toward the first end of the second gap region during relative rotation of the hub and the sleeve.

2. The fluid dynamic bearing of claim 1, wherein:
    the first gap region comprises a substantially vertical gap; and
    the second gap region comprises a substantially horizontal gap portion.

3. The fluid dynamic bearing of claim 1, further comprising a third gap region between the hub and an outer diameter portion of the sleeve.

4. The fluid dynamic bearing of claim 3, wherein the third gap is configured to form a capillary seal.

5. The fluid dynamic bearing of claim 1, wherein the hub further comprises a radial shoulder for receiving a disc.

6. The fluid dynamic bearing of claim 5, wherein the hub and sleeve are part of a spindle motor for a disc drive system.

7. The fluid dynamic bearing of claim 1, wherein the shaft portion is adapted to rotate within the sleeve on a counterplate.

8. The fluid dynamic bearing of claim 1, wherein the oil pumping groove pattern defines at least one groove formed in a bottom surface of the horizontal body portion of the hub.

9. The fluid dynamic bearing of claim 1, wherein the oil pumping groove pattern defines at least one groove formed in a top surface of the sleeve.

10. The fluid dynamic bearing of claim 1, wherein the oil pumping groove pattern defines a spiral pattern.

11. A hub and sleeve bearing, comprising:
    a hub comprising a shaft portion having an outer cylindrical surface and a second portion surrounding and coupled to a first end of the cylindrical surface of the shaft portion, the second portion having an annular surface disposed substantially perpendicular to the long axis of the outer cylindrical surface of the shaft portion;
    a sleeve comprising an inner cylindrical surface that is configured to face the outer cylindrical surface of the shaft portion of the hub in a substantially coaxial orientation, the inner cylindrical surface and the outer cylindrical surface defining a first gap, wherein at least a portion of at least one of the inner cylindrical surface and the outer cylindrical surface comprises a first groove pattern formed therein, the first groove pattern being configured as a fluid dynamic journal bearing and
    wherein the sleeve further comprises an annular surface disposed substantially parallel to the annual surface of the second portion of the hub and defining a second gap, the second gap having a first end region in fluidic communication with the first gap and a second end region exposed to an ambient environment, wherein at least a portion of at least one of the annular surface of the sleeve and the annular surface of the second portion of the hub comprises a scond groove pattern formed therein, the second groove pattern configured to pump fluid away from the second end region and toward the fluid dynamic journal bearing.

12. The hub and sleeve bearing assembly of claim 11, wherein the second gap is further configured to form a capillary seal by diverging distally to the axis of the outer cylindrical surface.

13. The hub and sleeve bearing assembly of claim 11, wherein the shaft portion of the hub further comprises a radial end surface distal the first end outer cylindrical surface, the radial end surface disposed to face a radial surface of the sleeve, wherein the radial end surface of the shaft portion of the hub and the radial surface of the sleeve are further disposed to be in contact when the hub and sleeve are relatively stationary and to define a third gap when the hub rotates relative to the sleeve.

* * * * *